(12) United States Patent
Geiszler et al.

(10) Patent No.: US 6,611,199 B1
(45) Date of Patent: *Aug. 26, 2003

(54) CAPACITIVELY POWERED PORTABLE COMMUNICATION DEVICE AND ASSOCIATED EXCITER/READER AND RELATED METHOD

(75) Inventors: Theodore D. Geiszler, Los Gatos, CA (US); Larry W. Fort, Mesa, AZ (US); George L. Lauro, Bedford Village, NY (US); Russel E. Walker, San Jose, CA (US); Noel H. Eberhardt, Cupertino, CA (US); Victor Allen Vega, Hercules, CA (US); John H. Rolin, San Jose, CA (US); Sebastian Thomas Kakkanad, San Jose, CA (US); Richard R. Fletcher, Cambridge, MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/061,146

(22) Filed: Apr. 16, 1998

(Under 37 CFR 1.47)

Related U.S. Application Data

(63) Continuation-in-part of application No. 08/540,813, filed on Oct. 11, 1995, now abandoned.

(51) Int. Cl.[7] .................................................. H04Q 1/00
(52) U.S. Cl. ........................... 340/10.51; 340/572.7; 340/527.8; 340/693.5
(58) Field of Search .................. 340/10.51, 10.34, 340/572.7, 572.8, 693.5; 235/492; 342/42, 45; 343/841

(56) References Cited

U.S. PATENT DOCUMENTS

| | | |
|---|---|---|
| 4,480,178 A | 10/1984 | Miller, II et al. |
| 4,605,844 A | 8/1986 | Haggan |
| 4,650,981 A | 3/1987 | Foletta |
| 4,818,855 A | 4/1989 | Mongeon et al. |
| 4,835,373 A | 5/1989 | Adams et al. |
| 4,841,128 A | 6/1989 | Grottrup et al. |
| 4,960,983 A | 10/1990 | Inoue |
| 5,099,227 A | 3/1992 | Geiszler et al. |
| 5,175,418 A | 12/1992 | Tanaka |
| 5,528,222 A | 6/1996 | Moskowitz et al. |
| 5,548,291 A * | 8/1996 | Meier et al. ............. 340/10.34 |
| 5,566,441 A | 10/1996 | Marsh et al. |
| 5,682,143 A | 10/1997 | Brady |
| 5,854,480 A | 12/1998 | Noto |
| 6,001,211 A | 12/1999 | Hiroyuki |
| 6,040,773 A * | 3/2000 | Vega et al. ............. 340/572.7 |
| 6,404,339 B1 * | 6/2002 | Eberhardt ................. 340/10.1 |

FOREIGN PATENT DOCUMENTS

| | | | |
|---|---|---|---|
| DE | 40 17 934 C2 | 8/1990 | |
| DE | 40 17 934 | 1/1992 | ............. H04B/5/00 |
| EP | 0 260 221 A2 | 3/1987 | |
| EP | 0 245 196 | 4/1987 | |
| EP | 0 260 221 | 3/1988 | ............. H04B/5/00 |
| EP | 0 702 316 A1 | 3/1996 | |
| GB | 2 149 548 A | 6/1985 | |

* cited by examiner

Primary Examiner—B Zimmerman
(74) Attorney, Agent, or Firm—Wayne J. Egan; Terri S. Hughes

(57) ABSTRACT

A portable communication device uses a first electrostatic antenna element and a second electrostatic antenna element and circuitry which is coupled to the first antenna element and to the second antenna element and which derives operating power from an electrostatic field in the vicinity of the first and second antenna elements. The electrostatic field may be provided by an array of exciter elements containing both horizontal and vertical exciter elements so that at some point as a communication device is moved across the exciter antenna array, the device will have sufficient power coupled to it to power up and become operational.

64 Claims, 13 Drawing Sheets

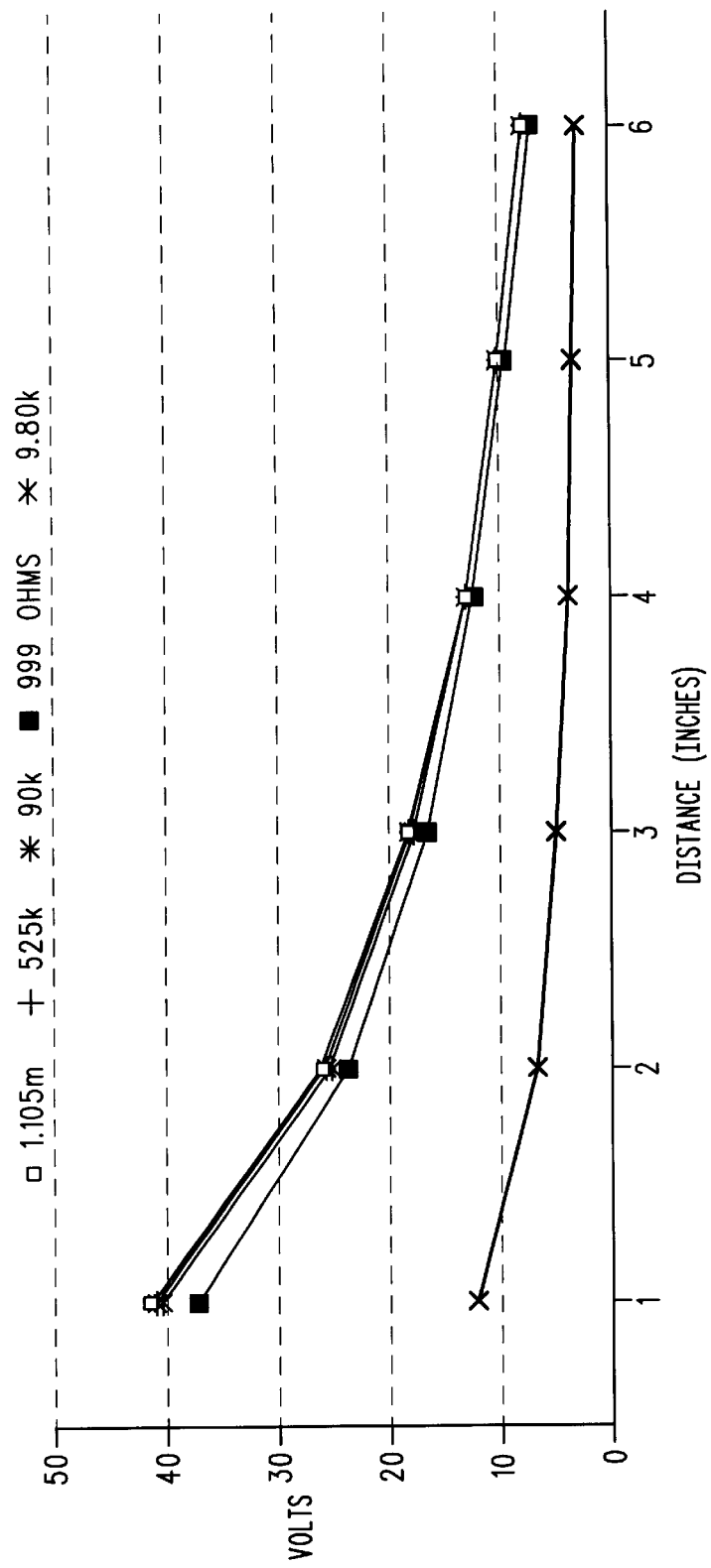

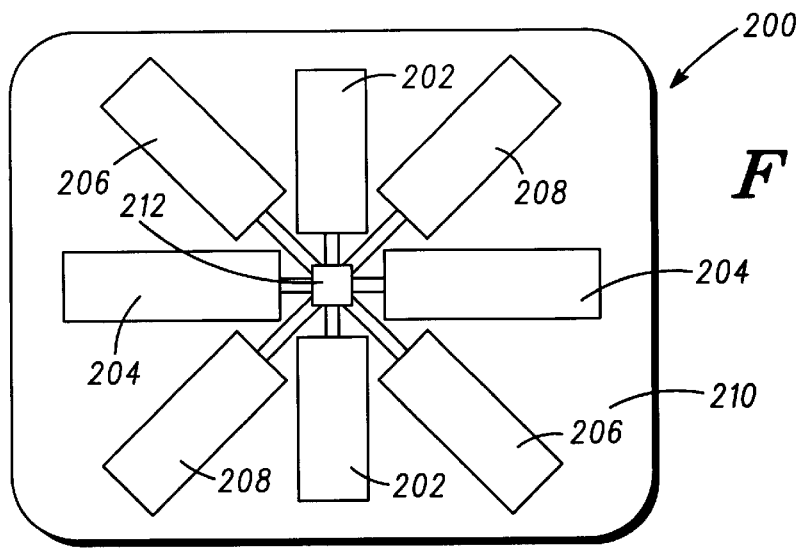
*FIG.11*
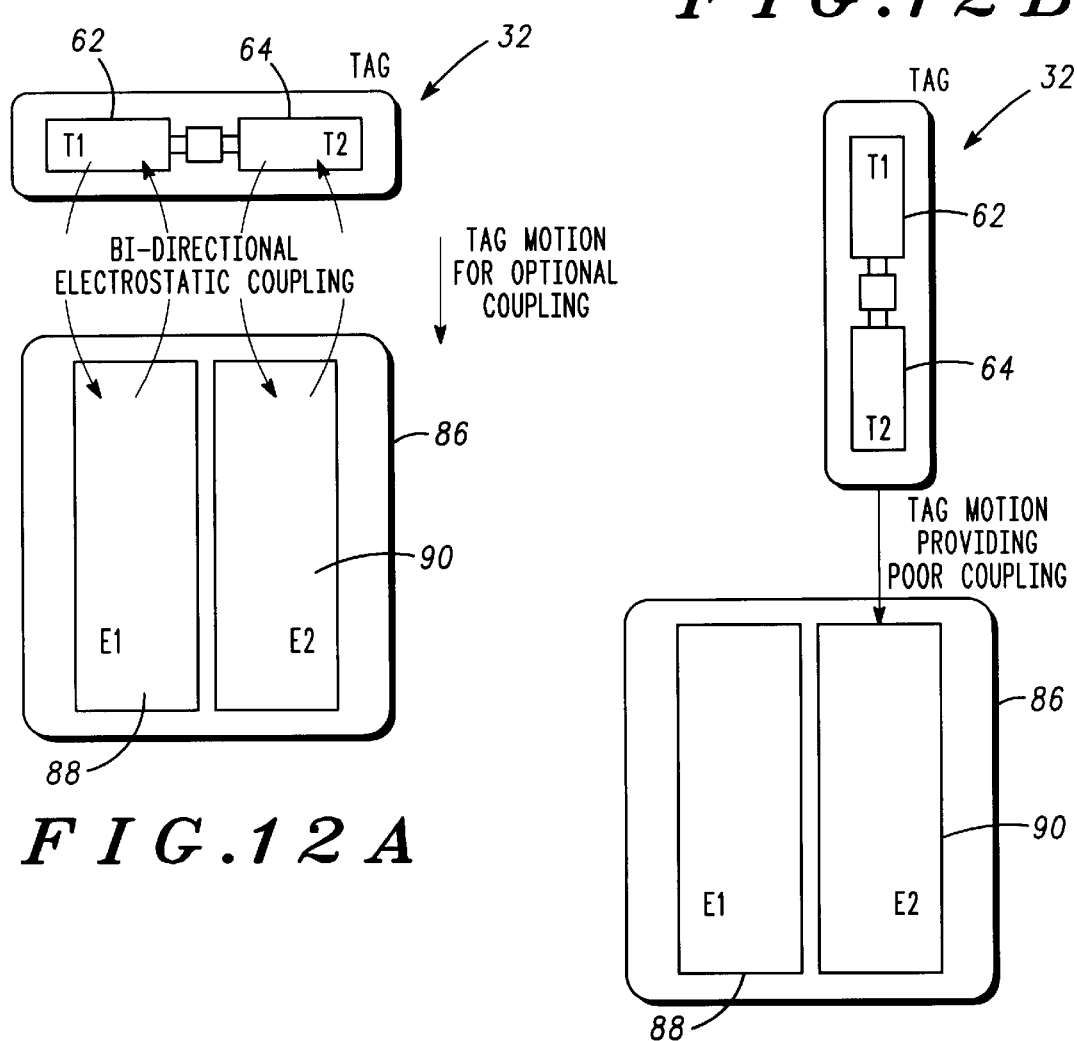
*FIG.12B*
*FIG.12A*

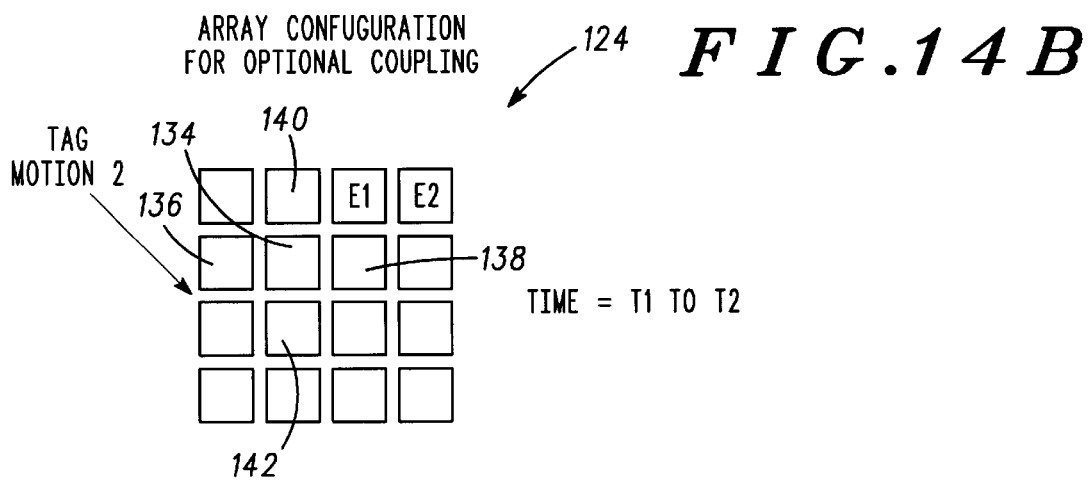
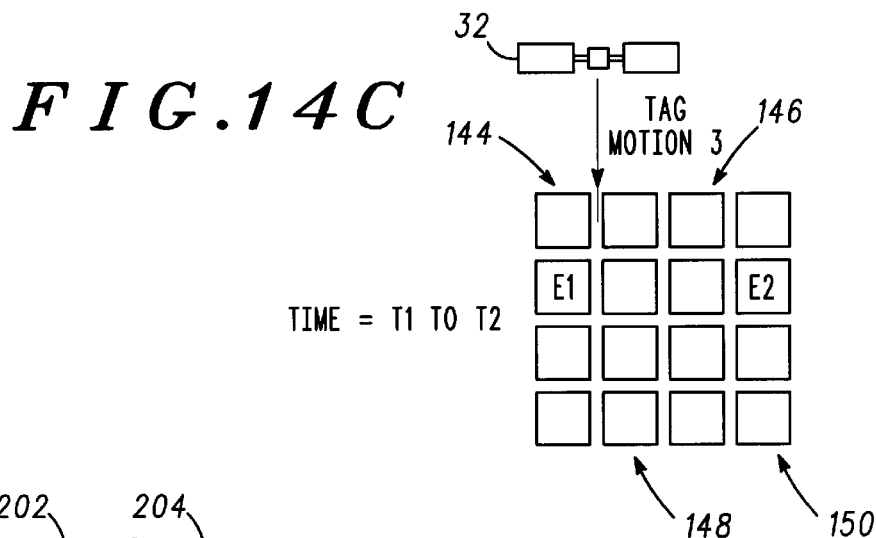
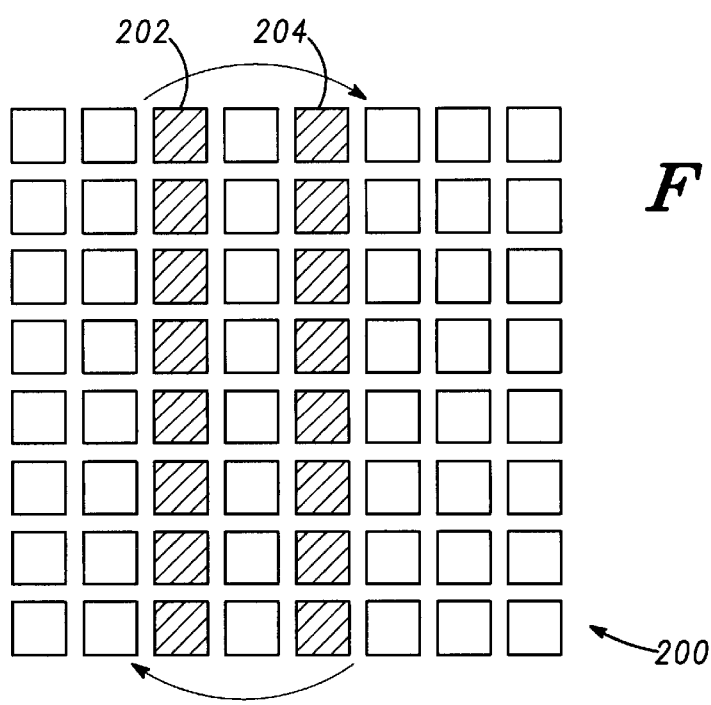

CAPACITIVELY POWERED PORTABLE COMMUNICATION DEVICE AND ASSOCIATED EXCITER/READER AND RELATED METHOD

CROSS-REFERENCE TO RELATED APPLICATION

This is a continuation-in-part of commonly assigned prior U.S. patent application Ser. No. 08/540,813, filed Oct. 11, 1005 by Ted Geiszler et al. now abandoned, titled "Remotely Powered Electronic Tag and Associated Exciter/Reader and Related Method", the disclosure of which prior application is hereby incorporated by reference, verbatim and with the same effect as though it were fully and completely set forth herein.

FIELD OF THE INVENTION

The invention relates generally to portable remotely powered communication devices and to systems for powering up and receiving information from such devices, and more particularly, to such devices and systems that employ electrostatic coupling.

BACKGROUND OF THE INVENTION

Remotely powered electronic devices and related systems for powering up and receiving stored information from such devices are well known. For example, U.S. Pat. No. 4,818,855 issued to Mongeon et al., entitled, Identification System, discloses a remotely powered identification device which derives power from a remote source via one of an electric field or a magnetic field and which transmits stored information back to the source via the other of the electric field or magnetic field. Similarly, U.S. Pat. No. 5,099,227 issued to Geiszler et al., entitled, Proximity Detecting Apparatus, discloses a remotely powered device which uses electromagnetic coupling to derive power from a remote source and which uses both electromagnetic and electrostatic coupling to transmit stored data back to the source.

In the earlier systems described above, an electromagnetic mechanism is used to remotely couple the remote device with either one or both of an exciter system and a receiver system. The exciter generates an excitation signal used to power up the device. The receiver receives the signal produced by the remote device. One reason for the use of electromagnetic coupling in prior devices is that it was believed to be more efficient to remotely couple power from an exciter to a device via an electromagnetic field rather than via an electrostatic field. Moreover, it was believed that in order to employ an electrostatic mechanism to couple energy from an exciter to a remote device using a single-plate antenna, relatively high voltage signals were required. However, the ability to emit higher voltage signals for power up often is limited by FCC regulations.

Earlier electromagnetic coupling mechanisms included an oscillator as part of the exciter circuitry and coil antennas mounted on both the exciter circuitry and a tag or other article that embodied the device and contained its electronic circuit. For example, in one earlier system excitation circuitry is connected to a coil antenna which radiates excitation signals that are picked up by a coil antenna mounted on a tag that contains the electronic circuit. The excitation signals energize the electronic circuit which automatically produces an information carrying signal that is transmitted to the receiver using electromagnetic or electrostatic coupling.

An ongoing objective in the development of remote communication devices and associated exciters/receivers of the general type described above has been to minimize cost and size and to improve efficiency of operation. A problem with the use of electromagnetic coupling between a remote device and either an exciter or a reader has been the additional complexity involved in the manufacture of remote devices that employ a coil antenna. For example, the spiral layout of a typical coil antenna can be more difficult to produce than the simpler layout of an electrostatic antenna which often can be in the form of a straight wire or planar and plate-like. Another problem, explained above, has been the inability to efficiently couple power electrostatically using acceptable voltage levels. As a consequence, electromagnetic coupling generally has been favored over electrostatic coupling.

Thus, there has been a need for a low cost remotely powered communication device that employs electrostatic coupling both for remote power up and for the transmission of information carrying signals. There also has been a need for an improved method and apparatus for coupling electrostatic power up signals to such a device. The present invention meets these needs.

BRIEF DESCRIPTION OF THE DRAWINGS

FIG. 6A provides a curve which plots voltage across T1 and T2 versus distance away from E1 and E2 over one inch intervals from 1 inch to 8 inches, where T1 and T2 each is rectangular and measures 2 inches by 3 inches.

FIG. 6B provides the actual voltage measurements plotted in FIG. 6A.

FIG. 11 is a top elevation view of an alternative embodiment of a remotely powered communication device in accordance with the invention which includes four pairs of antenna elements.

FIGS. 12A–12B show the device of FIG. 8A in two different orientations relative to a portion of an array of exciter elements.

FIGS. 14A–14C are simplified top elevation views of three more alternative configurations of a portion of an array of commutated exciter elements; FIG. 14A shows a horizontal configuration; FIG. 14B shows a diagonal configuration; and FIG. 14C shows a vertical configuration.

FIG. 15 is a simplified top elevation view of yet another alternative commutated exciter array configuration in which two parallel stripes of exciter elements are dynamically swept in a circular pattern.

DESCRIPTION OF THE PREFERRED EMBODIMENTS

The present invention provides an improved electrostatically coupled communication device and associated methods of operation, methods of manufacture and related exciter/reader systems. In one aspect, the invention provides an electronic communication device which is powered-up by electrostatic signals. The novel device can be relatively inexpensively produced since it employs electrostatic (capacitive) plates for both data transmission and for power-up, and therefore, does not require a magnetic coil.

These and other features and advantages of the invention will become more apparent from the following detailed description of presently preferred embodiments in conjunction with the appended drawings.

The present invention comprises a remotely powered communication device, an associated exciter/reader system and related methods. The following description is presented to enable any person skilled in the art to make and use the invention. Descriptions of specific applications are provided only as examples. Various modifications to the preferred embodiments will be readily apparent to those skilled in the art, and the general principles defined herein may be applied to other embodiments and applications without departing from the spirit and scope of the invention. Thus, the present invention is not intended to be limited to the embodiments shown, but is to be accorded the widest scope consistent with the principles and features disclosed herein.

Figure 1:
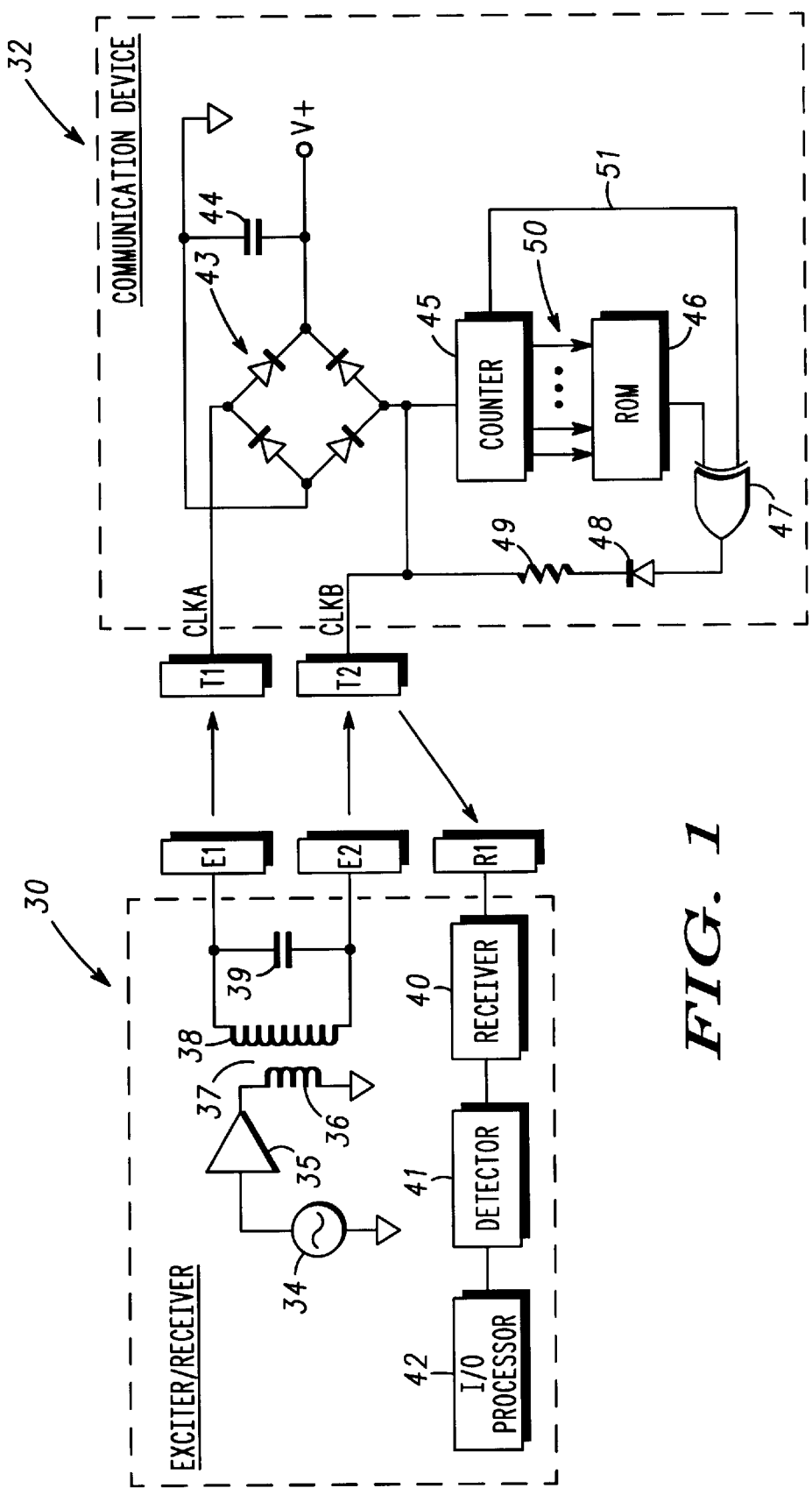
FIG. 1 is a block diagram of an exciter/reader and a remotely powered communication device in accordance with a presently preferred embodiment of the invention.

Referring to the illustrative drawings of FIG. 1, there is shown a block diagram of an exciter/reader apparatus 30 and a remotely powered communication device 32 in accordance with a presently preferred embodiment of the invention. The exciter portion of the apparatus 30 produces electrostatic signals that are used to power up the device 32. The reader portion of the apparatus 30 receives electrostatic communication signals produced by the device 32 once it has been powered up. The device, for example, can serve as an electronic identification card. In one application, for example, when the device 32 is placed in close proximity to the exciter/reader apparatus 30, the exciter sends electrostatic signals that power up the device 32. The device then automatically transmits an electrostatic signal that carries identifying information. The reader portion of the apparatus 30 receives the identifying signals and determines whether to trigger some action such as the opening of a locked door.

The exciter portion of the apparatus 30 includes an oscillator 34, which generates a signal at frequency $F_0$. The oscillator is connected to a power amplifier 35 which, in turn, is connected to the primary coil 36 of an impedance transformer 37. A secondary coil 38 of the impedance transformer 37 is connected in parallel with a capacitor 39. A top terminal of the secondary coil 38 is connected to a first electrostatic exciter antenna plate E1, and a bottom terminal of the secondary coil 38 is connected to a second electrostatic exciter antenna plate E2. In a present embodiment, the exciter includes a pair of antenna plates that operate as a balanced out of phase pair. In another embodiment described below, the exciter includes an array of balanced out of phase antenna plates. For the sake of simplicity, however, the following description of FIG. 1 discusses only two exemplary exciter plates, E1 and E2. Alternatively, for example, wire antenna exciter elements or a comb-like structure may be employed instead of antenna plates, for example.

The reader portion of the apparatus 30 includes a single-plate electrostatic reader antenna plate R1 connected to a receiver 40 which provides input signals to a detector 41. An I/O processor 42 receives signals from the detector 41.

A current embodiment of the remotely powered communication device 32 includes first and second electrostatic device antenna plates T1 and T2 which are connected as shown to provide clock A and clock B inputs to a full wave bridge rectifier 43. Note that T1 and T2 are electrically isolated from each other. Alternatively, for example, wire antenna elements can be used instead of plates. A capacitor 44 is connected across the V+ and "common" terminals of the rectifier 43. The clock B input is also provided to a frequency dividing counter circuit 45. The counter 45 is connected to provide address signals to a digital storage device, a read only memory (ROM) 46 in a current embodiment. A modulator circuit, in the illustrative embodiment a biphase modulator implemented as an exclusive-or gate 47, receives clock signals, at frequency $F_0/n$, from the counter 45 and data output from the ROM 46. The output of modulator circuit (the exclusive-or gate 47) is provided via diode 48 and resistor 49 to the clock B line.

While the device 32 of the presently preferred embodiment employs biphase modulation, virtually any modulation technique can be used consistent with the invention. For example, PSK, FSK, AM or other modulation schemes can be used as alternatives. Moreover, in the current embodiment, the modulated signal is returned to the clock B input for transmission to the reader via antenna plate T2. However, as an alternative for example, the modulated signal could be provided to a separate antenna element (not shown) for transmission to the reader. An alternate embodiment which includes such a separate data transmission antenna element is discussed below with reference to FIG. 2.

In operation, the oscillator 34 of a presently preferred embodiment generates a 4 Megahertz signal which is approximately 2–5 volts peak to peak. The signal is boosted to approximately 20–30 volts peak to peak by the amplifier 35. The impedance transformer 37 further boosts the voltage to approximately 300–400 volts peak to peak. The parallel connected capacitor 39 tunes the transformer circuitry to make it resonant at the oscillator frequency. The signal provided to exciter plate E1 via the top terminal of the secondary coil 38 is balanced and 180 degrees out of phase with the signal provided via the bottom terminal of the secondary coil 38 to exciter plate E2. The exciter plates E1 and E2 produce electrostatic energy, indicated by the arrows, which is used to power-up the communication device 32. It will be appreciated that the desired voltage levels of the electric field may depend upon factors such as the distance over which the exciter is to power-up the device 32. Additionally, the desired voltage levels may, for example, depend upon frequency emission requirements of the country in which the exciter will operate. Moreover, certain operations such as writing data into device memory may require more power than other operations such as reading information from device memory.

The electrostatic field produced by the exciter elements E1 and E2 excites voltages on antenna elements T1 and T2. The T1 element is connected to provide the clock A input to the full wave bridge rectifier 43, and the T2 element is connected to provide the clock B input to the rectifier 43. T1 and T2 are not connected directly to each other. The capacitor 44 filters out exciter pulses from the received power up signals to ensure a pure DC output of the rectifier. The rectifier provides a V+ DC voltage signal relative to a "common" terminal of the rectifier 43. It will be appreciated that a pure D.C. signal is not required. Some ripple in the V+ voltage signal may be acceptable depending upon the implementation of the device circuitry. The counter 45 receives the 4 Megahertz clock B signal and provides a set of address signals on lines 50 which are used to address and to set the data rate for the output of data from the ROM 46. The different signals on the different lines 50 are produced by dividing the 4 Megahertz by different values in a manner well known by those skilled in the art.

It will be understood that although the preferred embodiment uses a 4 Megahertz signal, signals of a different frequency could be used. For example, a 13.56 Megahertz signal or a 37.5 Megahertz signal could be employed.

The counter also provides on line 51 a 2 Megahertz carrier signal which serves as the clock input (or carrier signal input) to the exclusive-or gate 47. The data output of the ROM 46 serves as a data input (or modulation signal input) to the exclusive-or gate 47. The counter, therefore, divides the input frequency by two to provide a carrier signal and sets the data rate of data signals output by the ROM 46 that modulate the carrier. The exclusive-or gate 47 serves as a biphase modulation circuit, and its output is a biphase modulated signal which is provided via diode 48 and resistor 49 to clock B signal line. The biphase signal is injected back onto the T2 antenna element and is electrostatically coupled to the receiver portion of the exciter/receiver 30. The role of the diode 48 and the resistor 49 is to couple modulated signals back to the clock B input. As explained above, there are numerous other modulation schemes that use different modulation circuits consistent with the invention. Moreover, as explained below with reference to FIG. 2 it can be advantageous to employ a third antenna element dedicated to data transmission on a communication device in accordance with the invention.

The electrostatic receiver antenna R1 receives the electrostatically transmitted signals emitted by device antenna element T2, and provides those received signals to the receiver 40 which amplifies the signals and may convert their frequency to an intermediate frequency for further amplification and bandpass filtering of the signals before providing them to the detector circuit 41 which detects data carried by the received signals. The receiver 40 and the detector 41 are well known circuits which need not be described in detail herein. The detector 41 provides the data signals to the I/O processor 42 which produces an output in a format usable by a host computer (not shown), for example.

The transmission of balanced out of phase electrostatic signals via exciter elements E1 and E2 couples energy to the device 32 via the device electrostatic antenna elements T1 and T2. When the voltage on exciter element E1 is at a positive level, for example, the voltage on element E2 is at a negative level. Conversely, when the voltage on exciter element E1 is at a negative level the voltage on exciter element E2 is at a positive level. The objective is to have the balanced out of phase voltages on E1 and E2 cause the voltages of device antenna elements Ti and T2 to produce a balanced out of phase relation to each other. The desired result is to always have a voltage potential difference between the device elements, T1 and T2, such that a V+ DC supply voltage source can be produced relative to a "common" potential. In essence, the exciter elements, E1 and E2, are capacitively coupled to the device elements, T1 and T2. This approach permits power to be more efficiently coupled using electrostatic energy.

Moreover, because the exciter antenna elements E1 and E2 produce electrostatic fields that are balanced and out of phase, these fields often tend to cancel each other at farther distances, reducing the risk of exceeding FCC or other regulatory agency emissions limits, for example. As a consequence, the exciter signals often can use higher power up voltage levels.

Figure 17:
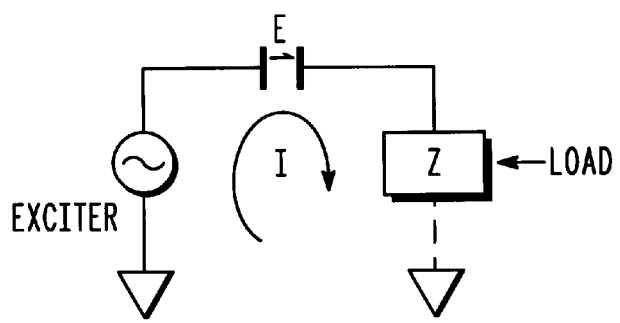
FIG. 17 is a simplified schematic of a system that employs an unbalanced excitation signal, where the excitation signal is capacitively coupled to the remotely powered device that is coupled to an external ground potential.

Instead of using balanced out of phase excitation signals, unbalanced excitation signals can bested as an alternative in accordance with the invention. In particular, for example, a, single excitation antenna element could be employed to produce a periodic electrostatic excitation signal. A remotely powered communication device, for example, that was powered up by such an unbalanced signal would include a single antenna element with one terminal connected to a clock B input (which input is designated "CLKB" in FIG. 1 and FIG. 2). It is important, however, that such alternative remotely powered communication device be coupled to an external ground potential as shown in FIG. 17. In such an alternative remotely powered communication device embodiment, the single power-p antenna element also could be used to transmit and receive data signal as well.

It is desirable for the device 32 to consume relatively little power. Hence, the information carrying signals transmitted by antenna element T2 are relatively low power. The receiver 40 is highly sensitive and capable of extracting data from the relatively (low power) weak signals transmitted by the device 32.

Note that T1 and T2 are not required to have half wavelength dimensions of a typical electromagnetically excited two element antenna. The elements are electrostatically excited, through capacitive coupling, and need not be resonant as required for electromagnetic coupling. The elements can, therefore, be of an arbitrary size sufficient for capacitive (electrostatic) coupling. In general capacitive coupling increases with increased antenna area and increased signal frequency. In addition, the device antenna elements need not have a characteristic impedance as do resonant antenna elements. The spacing apart of the exciter antenna elements E1 and E2, however, should be well matched to the spacing of the device antenna elements T1 and T2 in order to efficiently couple energy from the exciter to the device.

Figure 2:
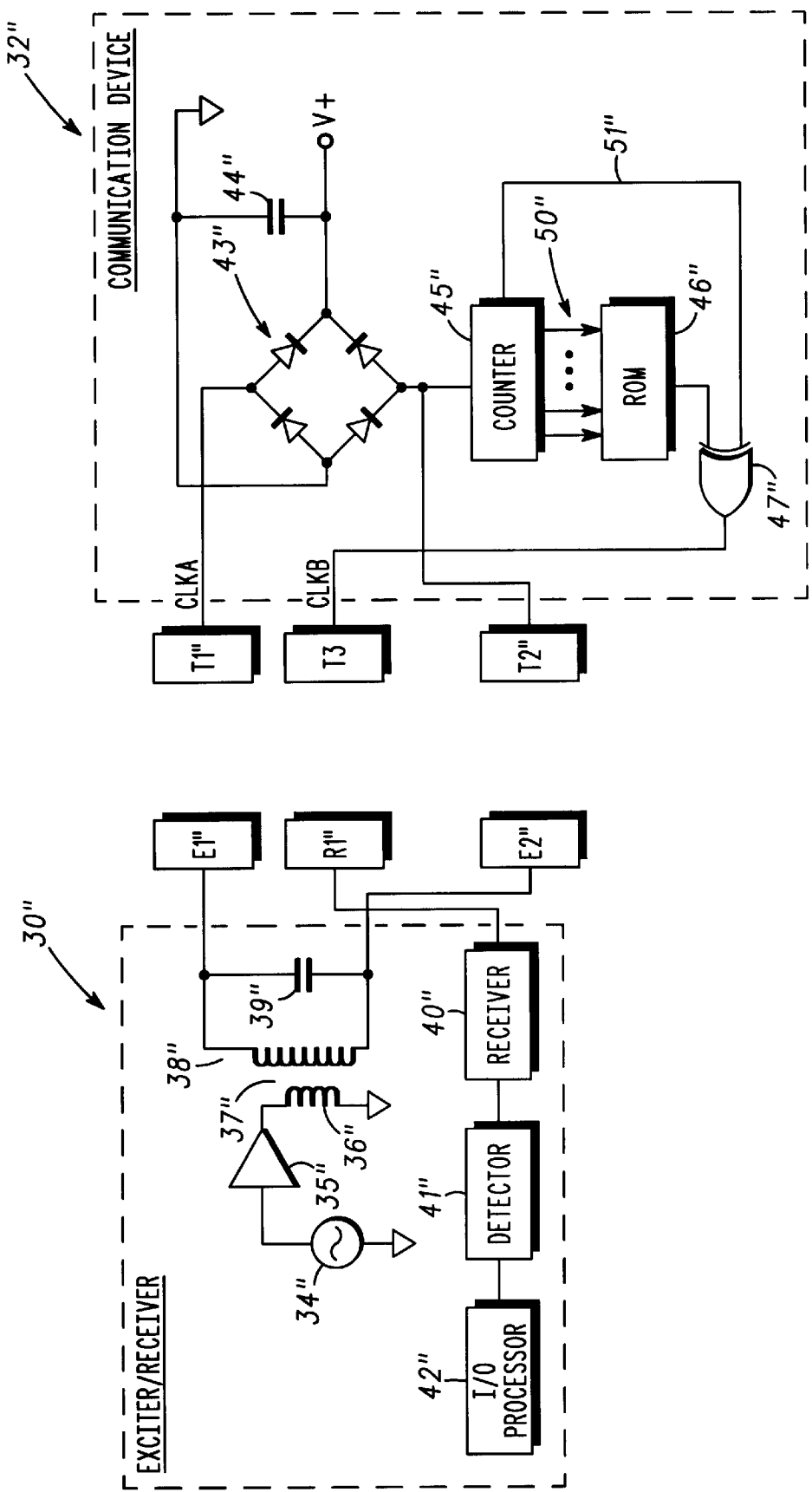
FIG. 2 is a block diagram of an alternative embodiment of an exciter/reader and a remotely powered communication device in which the device has a dedicated data transmission antenna element.
Figure 3A:
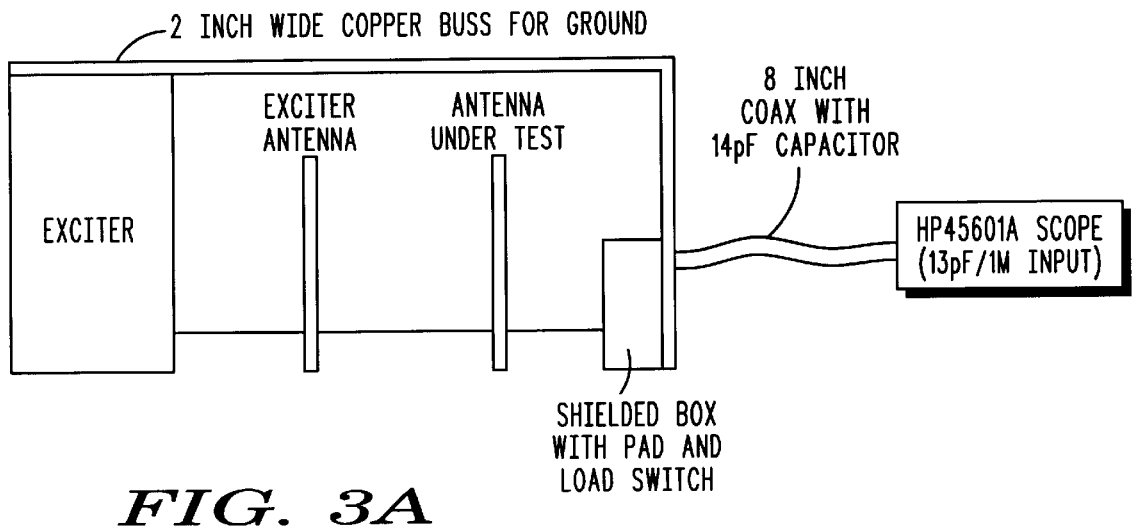
FIGS. 3A–3B illustrate a test set up used to perform voltage measurements (V), across T1 and T2, in which a T1 terminal was connected to ground potential and load resistance values ($R_L$) represented different possible loads attributable to a different possible integrated circuits connected between the T1 and T2 terminals.
Figure 3B:
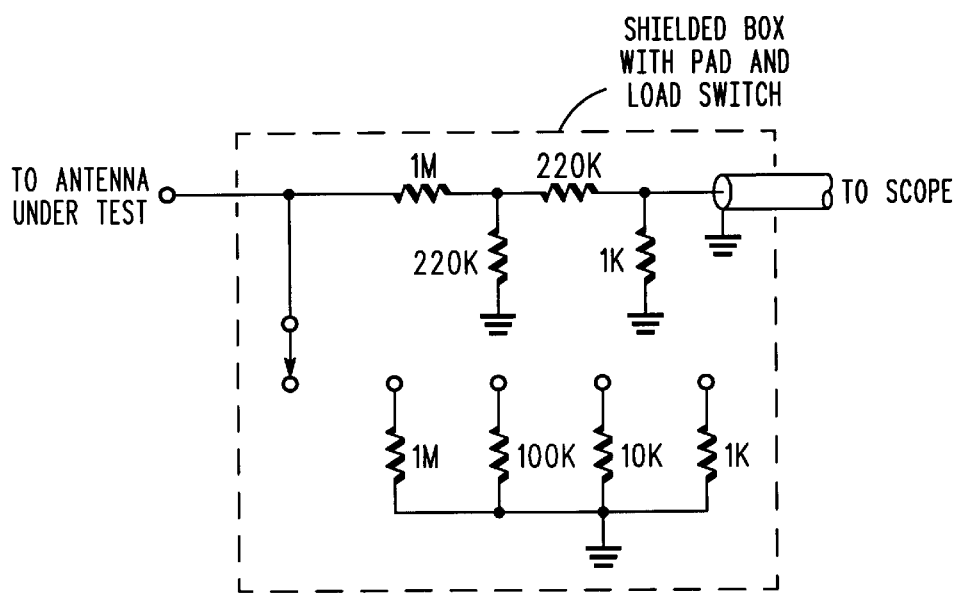
Figures 4A, 4B:
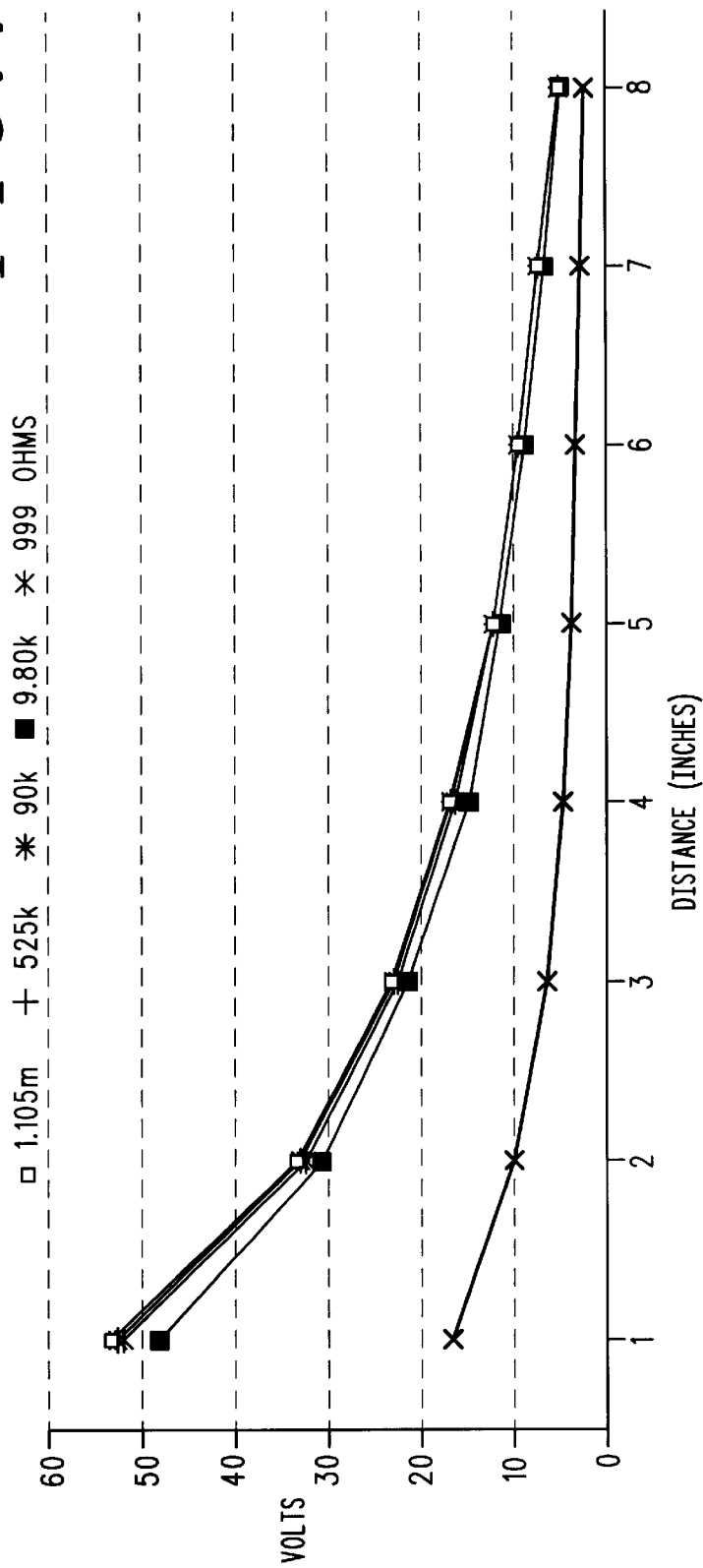
FIG. 4A provides a curve which plots voltage across TI and T2 versus distance away from E1 and E2 over one inch intervals from 1 inch to 8 inches, where T1 and T2 each is rectangular and measures 4 inches by 5 inches.
FIG. 4B provides the actual voltage measurements plotted in FIG. 4A.
Figures 5A, 5B:
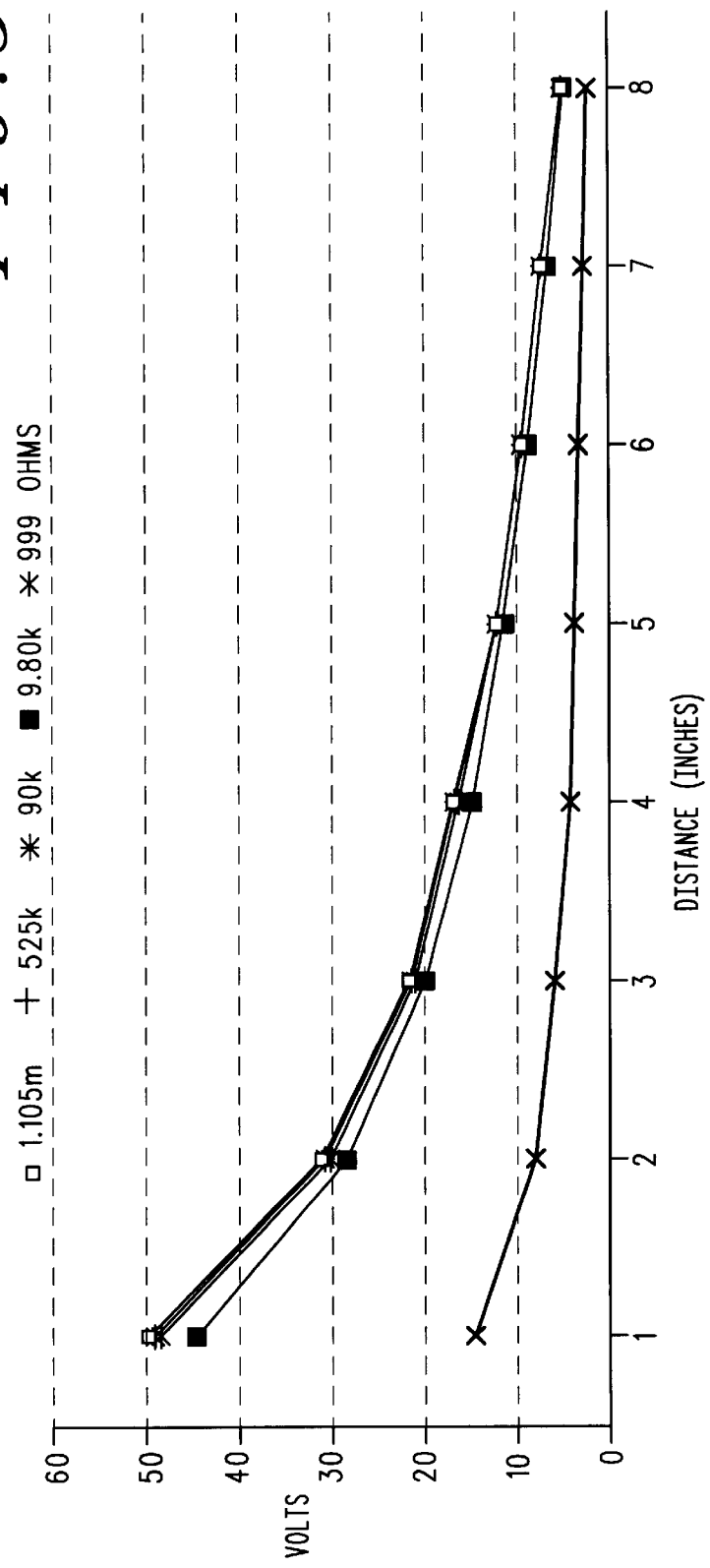
FIG. 5A provides a curve which plots voltage across T1 and T2 versus distance away from E1 and E2 over one inch intervals from 1 inch to 8 inches, where TI and T2 each is rectangular and measures 3 inches by 4 inches.
FIG. 5B provides the actual voltage measurements plotted in FIG. 5A.
Figures 7A, 7B:
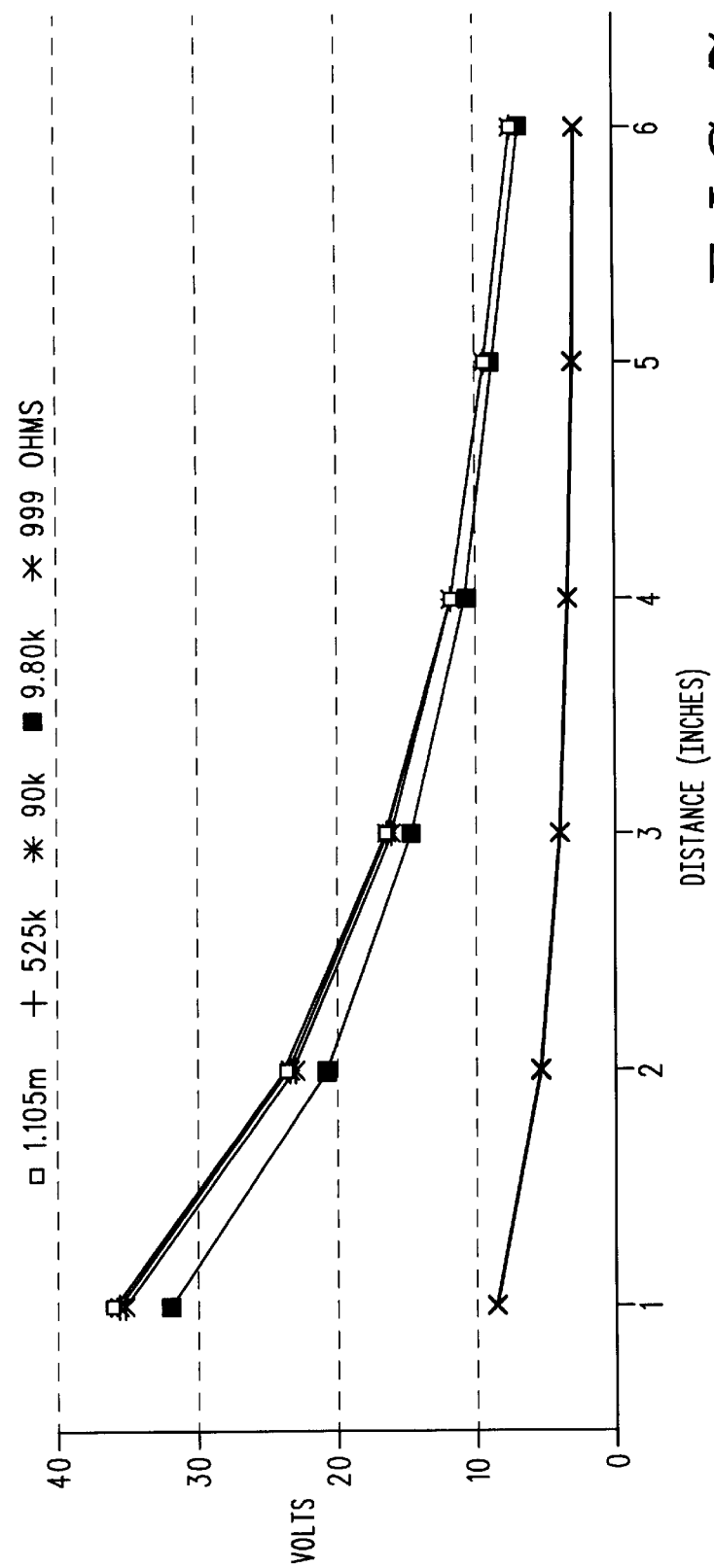
FIG. 7A provides a curve which plots voltage across T1 and T2 versus distance away from E1 and E2 over one inch intervals from 1 inch to 8 inches, where T1 and T2 each is rectangular and measures 0.5 inches by 5 inches.
FIG. 7B provides the actual voltage measurements plotted in FIG. 7A.

Referring to the illustrative drawing of FIG. 2, there is shown a simplified block diagram of an alternative embodiment of a communication device 32" and exciter/reader 30" in accordance with the invention. In virtually all respects the alternative device 32" of FIG. 2 is identical to the device 32 of FIG. 1 except for the addition of a third antenna element (T3) which is used solely for data transmission. In a current embodiment, T1" and T2" are connected to a bridge circuit 43" and to a counter 45", but there is no connection between the clock A" node or the clock B" node and the output of the data modulation circuitry 47".

The data terminal T3 is disposed in a null region between the power-up terminals T1" and T2". The null position is the place on the device 32" where the power-up fields produced by the exciter elements E1" and E2" substantially cancel each other out, and therefore, produce the minimum amount of interference with data signals transmitted by the device 32". When the device 32" is aligned with T1" and T2" aligned for maximum energy pick-up from exciter elements E1" and E2", the data transmission element T3 will experience minimal interference with transmissions to the reader element R1".

It should be understood that the word "remote" is intended to be a relative term. Depending upon the circumstances, the term, remote, may apply to distances from millimeters to larger ranges. Depending upon factors such as the voltage level of the electrostatic signals radiated by the exciter, the exciter and the device may have to be positioned very close to one another in order to power up the device; or it may be that they can be spaced farther apart and still achieve coupling. The term remote just means that power is coupled over the air from the exciter to the device. It is believed that, in general, increased signal frequency and increased antenna plate area tend to increase the distance over which electrostatic signals can power-up a tag device.

The power-up of the integrated circuit device 32 using electrostatic fields applied over distances such as those achieved in the experiments described with reference to the tables below, is a surprising result. In the past, electrostatic signals had been used to transmit data from a tag device to a reader device. In prior electrostatic data transfers, the data transfer signal often operated at approximately 80 per-cent of the power level of the power-up signal used to power-up the earlier tag device. A typical earlier reader had to be highly sensitive, achieving approximately 80–110 dB gain, in order to extract data from a carrier signal. In view of the relatively weak electrostatic coupling of data signals in earlier tag devices, it is surprising that electrostatic power-up is achieved, in accordance with the present invention, over the distances tested during the experiments.

The exemplary test results illustrated in FIGS. 3–7 demonstrate that electrostatic coupling, in accordance with the invention, can generate sufficient energy to power-up an integrated circuit device. It will be appreciated that power is proportional to $V2/R_L$. FIGS. 3A–3B show the test set up used to perform voltage measurements (V) across T1 and T2. The tests were performed on a tag device in which the T1 terminal was connected to ground potential. The load resistance values ($R_L$) represent different possible loads attributable to a different possible integrated circuits connected between the T1 and T2 terminals. FIG. 4A provides a curve which plots voltage across T1 and T2 versus distance away from E1 and E2 over one inch intervals from 1 inch to 8 inches, where T1 and T2 each is rectangular and measures 4 inches by 5 inches. The table in FIG. 4B provides the actual voltage measurements plotted in FIG. 4A. The curves and tables in FIGS. 5A–5B, 6A–6B and 7A–7B provide similar measurements for T1s and T2s that measure 3"×4", 2"×3" and 0.5"×5", respectively.

It is believed that the actual power that can be electrostatically coupled in accordance with the invention depends upon distance between the tag device and the exciter, tag device antenna area and signal frequency. An analytical approximation of device behavior has been derived from the empirical results set forth in FIGS. 3–7 and the supporting specification. The data in FIGS. 4–7 were imported into a commercially available computer program known as "Mathematica." Two-dimensional curve fitting was performed in order to find a least squares fit starting with a curve that is similar to the expression for a parallel plate capacitance (C=eA/d). The selected starting curve was $(V_d/N_x)=k^* (A_x{}^*A_d)^a/D^d_{xt} D^d_{xt}$, where "k" is a constant; "a" is an area exponent; and "d" is a distance exponent.

A derived equation for voltage coupling between the exciter and the communication device is:

$$V_d/V_x = 0.132586(A_x{}^*A_d)^{0.18}/D_{xt}, \text{ where}$$

$A_x$=exciter antenna element area
$A_d$=communication device antenna element area
$V_d$=device voltage
$V_x$=exciter voltage
$D_{xt}$=distance between device and exciter.

The use of electrostatic coupling both for device power up and for device transmission permits the production of simple and relatively inexpensive remotely powered communication devices. Referring to the illustrative drawing of FIG. 8A, there is shown a top elevation view of a presently preferred embodiment of a remote communication device 32 in accordance with the invention. The device 32 includes a substrate 58, a two element antenna 60, which includes a first element 62 (T1) and a second element 64 (T2), and an integrated circuit (IC) transponder 66. The antenna element 60 and the IC 66 are mounted on the substrate 58. The entire device 32 can be encapsulated in a protective structure (not shown) such as plastic or other material. The IC contains the device electronics described above. The first and second elements 62 (T1) and 64 (T2) comprise a conductive pattern formed on the substrate. In a current embodiment, the elements 62 and 64 can be electrically connected to high impedance terminations to pads on the bottom of the IC 66. Since the device 32 operates as a low current device, high impedance terminations can be employed. The two element antenna 60 and the IC 66 can be electrically connected by any of a number of different mechanisms. For example, portions of the plates may be soldered to IC pads; or they may be secured to the pads with a conductive adhesive or by wire connections.

Figure 8A:
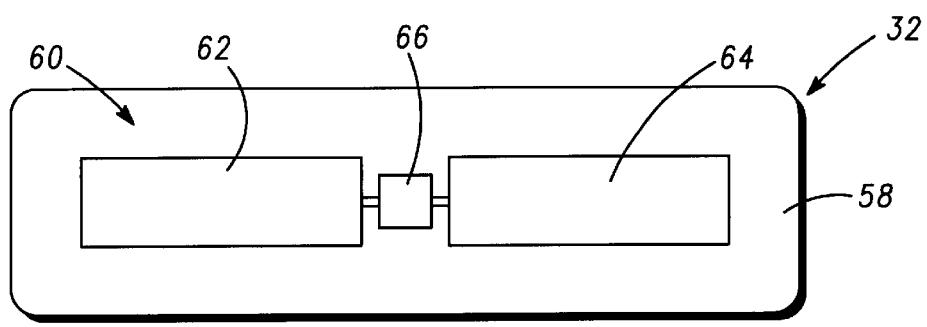
FIG. 8A is a top elevation view showing the layout of a presently preferred embodiment of the remotely powered communication device of FIG. 1.
Figure 8B:
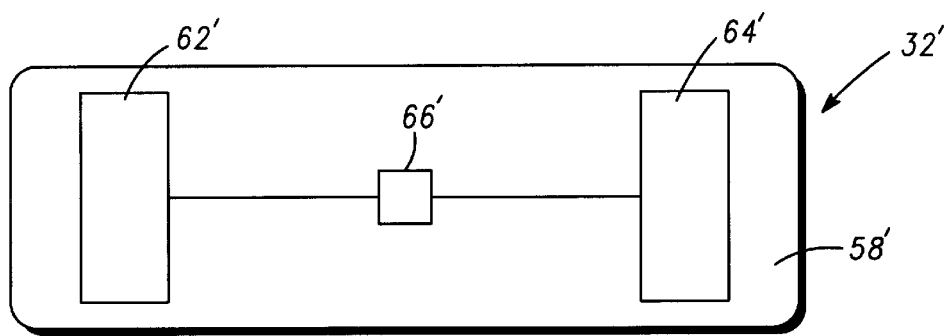
FIG. 8B is a top elevation view showing the layout of an alternative embodiment of the remotely powered communication device of FIG. 1.

Referring to the illustrative drawings of FIG. 8B, there is shown an alternative embodiment of a remote device 32' with an alternate antenna configuration. The antenna elements 62' and 64', are connected to an integrated circuit 66'. The antenna plates and the IC all are disposed on a substrate 58'. The alternative device 32' operates as described with reference to FIG. 1. The antenna elements 62' and 64', however, are disposed such that they are maximally spaced apart. That is, their elongated dimensions are substantially parallel to each other and perpendicular to an axis that extends between them and intersects the IC. An advantage of this increased spacing of the device antenna plates is a reduction of the risk of destructive interference between signals emanating from balanced out of phase exciter plates.

Figure 9A:
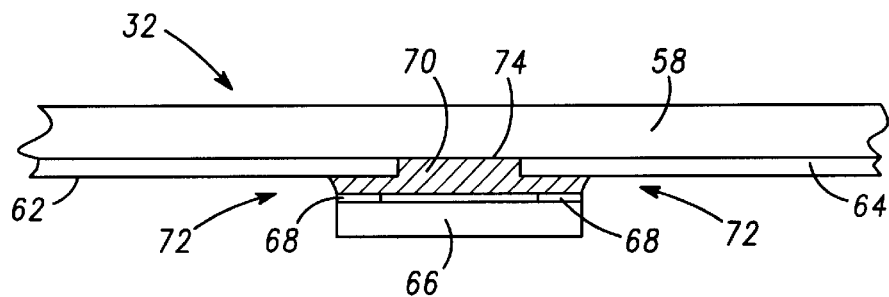
FIGS. 9A–9B are side cross-sectional views of the two different constructions of the devices of FIGS. 8A–8B.
Figure 9B:
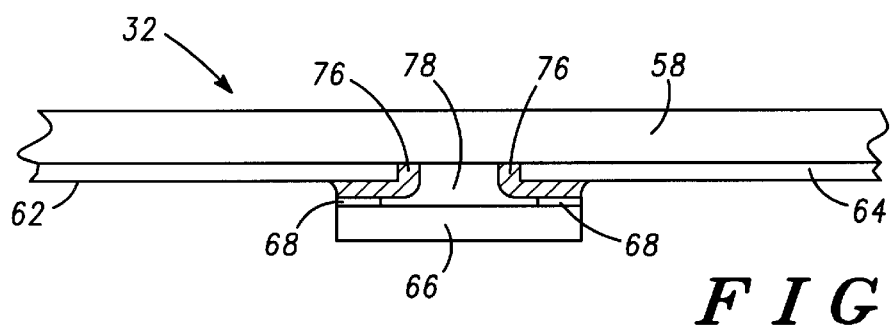

As explained in the following paragraphs, the device 32 (32' or 32") can be produced relatively inexpensively because of the simple layout and construction of the antenna elements 62 and 64. FIGS. 9A–9B are side cross-sectional drawings of two different constructions of the device of FIGS. 8A–8B. Referring to FIGS. 9A–9B, the substrate member 58 can be formed from any suitable material having desired characteristics such as, strength or flexibility, including paper, electrically insulating tape, polyester, polyethylene, polycarbonate, polypropylene, polypropylene with calcium carbonate ($CACO_3$) filler, plastic, or acetate for example. The antenna elements 62 and 64 are selected from any suitable conductive material such as copper, aluminum, silver or conductive ink containing copper, aluminum, silver, graphite or other conductive fillers for example. The antenna material can be selected based upon factors such as cost and ease of assembly or construction as well as intended usage. The elements can be produced on the substrate by any suitable process such as deposition, printing or etching. For deposition, any process, such as offset printing or roll printing, whereby a layer of (quasi) conductive material is deposited on the substrate can be used. For example, photocopying antenna plate patterns on paper or acetate using carbon loaded ink is possible. Also, vapor deposition of antenna patterns on a substrate is possible. Additionally, for instance, copper antenna elements can be produced using printed circuit board (PCB) manufacturing techniques. There are numerous etching processes such as etched copper, for instance, that can be used to produce antenna patterns on substrates. Furthermore, for example, antenna patterns may be cut from larger sheets of conducting material or hot stamped and adhered to the substrates. The production method can be selected based on factors such as cost, durability and performance of the remote device.

Figure 8C:
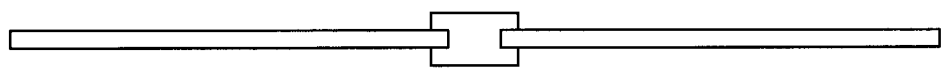
FIG. 8C is a top elevation view showing the layout of an alternative embodiment of the remotely powered communication device of FIG. 1 in which no substrate is employed.
Figure 8D:
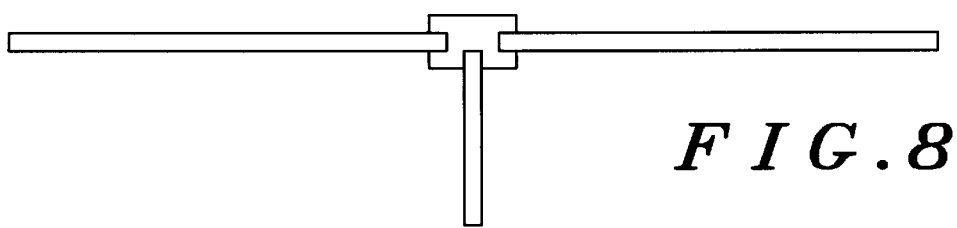
FIG. 8D is a top elevation view showing the layout of an alternative embodiment of the remotely powered communication device of FIG. 2 in which no substrate is employed.

As another alternative, for example, a communication device in accordance with the invention may comprise an integrated circuit plus electrostatic antenna elements which are not disposed on a substrate. Referring to the illustrative drawing of FIGS. 8C and 8D, there are shown communication devices in accordance with the invention, each of which includes an integrated circuit and electrostatic antenna elements. Neither the device of FIG. 8C nor the device of FIG. 8D, however, is mounted on a substrate. The integrated circuit of FIG. 8C is the general type described above in connection with FIG. 1 and is coupled to two electrostatic antenna elements. The integrated circuit of FIG. 8D is the general type described above in connection with FIG. 2 and is coupled to three electrostatic antenna elements. It will be appreciated that a device, like that in FIG. 8C or 8D, in which the IC and antenna elements are not disposed on a substrate at the time of manufacture may, nevertheless, be bonded subsequently to a substrate such as paper or plastic in order to ensure mechanical stability.

As is known, prior art tags and readers utilize inductive coupling to transfer power from the reader to the tag. Such an inductively coupled tag consists of an antenna coil, resonant capacitor and the functional electronics, all connected in parallel. In such a system, the LC tank circuit resonates at the excitation frequency of the magnetic field transmitted by the reader. The use of a resonant capacitor allows inductively coupled systems to operate at far greater and useful distances than they would with an antenna coil alone. This occurs because the energy stored in the LC tank circuit is substantially higher than the energy consumed by the functional electronics, causing the voltage developed across the antenna terminals to be much greater than that if a resonant capacitor were not used. Therefore, the minimum required operating voltage of the functional electronics can be obtained at practical and useful distances with resonant inductively coupled systems. The energy storage attribute is commonly referred to as the quality factor, or Q, and is well understood to those skilled in the art.

As is known, a performance limitation of such prior art inductively-coupled systems is that the resistances of the antenna coil, resonant capacitor, and the interconnections between them must be low enough to achieve a Q that is high enough to be useful. If any of these resistances are too high, they will impede the flow of LC circulating currents that are responsible for energy storage, thereby reducing the antenna coil voltage to an unusable level. This substantially limits the choice of materials and manufacturing processes that can be used, and establishes barriers to very low-cost manufacturing of inductively coupled systems.

In contrast, a feature of the present invention is that it does not rely upon either inductive coupling or energy storage to operate at useful distances. The electrostatic antennae, interconnections and associated conductive paths only need to pass the actual current consumed by the functional electronics. Therefore, the resistive loss restrictions of this invention are much more lenient than those of the prior art. Accordingly, the present invention allows a very broad range of conductive materials to be used for the antennae, interconnections and circuit paths, and allows greater design flexibility. This can reduce the cost of remotely powered communication devices produced in accordance with the invention.

The IC 66 may have multiple terminals or pads 68 that are electrically connected to the antenna 60. Each of the antenna elements 62 and 64 of the antenna electrically contacts a different pad. The two plates are kept electrically isolated from each other. In FIG. 9A, an anisotropic conductive adhesive 70 such as approximately 40% conductor filler (gold, silver or copper spheres or perhaps graphite for example) is used for the dual purposes of securing the IC to the substrate 58 and providing an electrical connection between the antenna elements 62 and 64 and the IC pads. The anisotropic conductive adhesive 70 conducting in one direction and nonconductive in a direction approximately perpendicular to the conduction path. In a present embodiment, it conducts better along paths in which the adhesive is subjected to greater pressure. In FIG. 9A, the anisotropic conductive adhesive is cured under greater pressure in the two narrow regions 72 where it is squeezed between the antenna elements 62 and 64 and the IC pads than in the wider recessed region 74 that separates the two plates between the rest of the IC and the substrate. Hence, there is conduction between each pad and the respective element adhered to it, but there is little or no conduction across the recessed region 74. The elements 62 and 64, therefore, are electrically isolated from each other. An advantage of the use of the anisotropic conductive adhesive 70 is that it need not be applied to the IC pads or to the antenna plates with precision since its conductivity depends upon applied pressure. Therefore, it can be easier to manufacture devices using the anisotropic conductive material because the adhesive can be applied to the active side of an IC or onto the substrate without the concern about overlapping onto other areas. As long as regions of the adhesive that are to be nonconducting are cured under lower pressure than the conductive regions, they will remain nonconducting and will not interfere with the isolation of the two antenna elements.

In FIG. 9B, isotropic conductive adhesive 76 such as is used to secure the IC to the substrate 58 and to create an electrical connection between the antenna elements 62 and 64 and the IC pads 68. An isolation material 78 such as solder mask or nonconductive ink or epoxy, is used to electrically isolate different globs of the isotropic conductive adhesive 76 used to adhere the different elements 62 and 64 to different pads 68. The isotropic conductive adhesive conducts equally well in all directions. It must be applied with care so that no conductive path is formed between the two electrically isolated antenna plates.

The object, for example, can be airline luggage. The tag device may have passenger identifying information written into its electronic memory during passenger check-in. The device is stuck to the side of the luggage to identify its owner. When the owner retrieves the luggage, he peels off the tag and discards it.

As explained above, in operation, the two antenna elements 62 (T1) and 64 (T2) must be at different voltages in order to power up the device 32. Specifically, electrostatic coupling for power up requires that a voltage differential (between V+ supply and "common") be set up within the device. In a present embodiment, the voltage differential is established across the two elements 62 and 64 by the balanced out of phase power up signals produced by the exciter. The two antenna elements are connected to a rectifier circuit, a full bridge rectifier in the presently preferred embodiment. A DC voltage is produced between V+ and common. In essence, V+ serves as VDD voltage supply, and common serves as substrate ground for the integrated circuit of the current embodiment.

Figure 10:
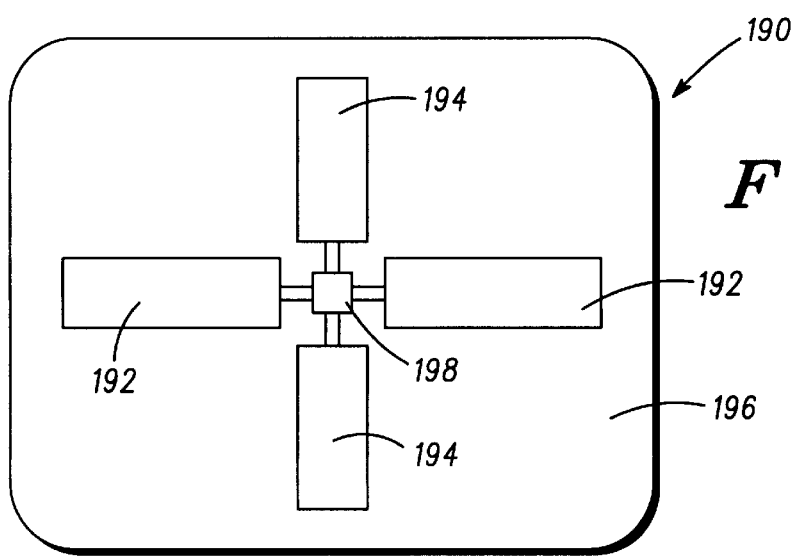
FIG. 10 is a top elevation view of an alternative embodiment of a remotely powered communication device in accordance with the invention which includes two pairs of antenna elements.

Referring to the illustrative drawings of FIG. 10, there is shown a first alternative embodiment of a remote communication device 190 in accordance with the invention. The device includes two pairs of antenna elements 192 and 194 disposed on a substrate 196 and connected to an IC 198 as shown. Referring to FIG. 11, there is shown a second alternative embodiment of a remote communication device 200. The device includes four pairs of antenna elements 202–208 disposed on a substrate 210 and connected to an IC 212 as shown.

The manufacture of the devices 190 and 200 can be similar to that of the devices of FIGS. 9A–9B. However, the presence of additional antennas provides greater opportunities for the remote device to align with the exciter plates as will be appreciated from the following discussion. As an alternative to additional device antennas, as explained below, the excitation pattern of an array of exciter plates can be systematically varied in order to produce the greatest likelihood of power up of a remote device regardless of device antenna orientation.

Referring to the illustrative drawings of FIGS. 12A and 12B, there is shown the device 32 of FIG. 8A in two different orientations relative to a portion of an antenna array 86 that can be employed by the exciter/reader apparatus 30. In each of FIGS. 12A and 12B the antenna array portion includes, a first exciter element 88 (E1) and a second exciter element 90 (E2). The exciter elements 88 (E1) and 90 (E2) have balanced out of phase power up signals applied to them as described above. It should be appreciated that the following discussion applies to the embodiment of FIG. 8B.

In FIG. 12A, the device 32 has its two antenna elements 62 (T1) and 64 (T2) oriented so that one of the two elements, element 62 (T1), is electrostatically coupled to the exciter element 88 (E1), and the other antenna element 64 (T2) is electrostatically coupled to the second exciter element 90 (E2). Since remote electrostatic coupling is, in essence, capacitive coupling the antenna element 62 (T1) should be positioned opposite (over) the first exciter element 88 (E1) in order for the first exciter element 88 to electrostatically couple its voltage to the element 62 (T1). This positioning is represented in FIG. 12A by the curved arrows. Similarly, the device antenna element 64 (T2) should be positioned opposite (over) the second exciter element 90 (E2) to electrostatically couple its voltage to element 64 (T2). It will be appreciated, of course, that it is the voltage differential between the two elements 62 (T1) and 64 (T2) that is important. The voltages on device elements 62 and 64 are dynamic. When the voltage on device element 62 is high, the voltage on device element 64 is low. Thus, it is not essential for example, that one of the two device elements 62 or 64 be at any particular voltage, such as ground potential, for power up to work. Furthermore, while the above explanation speaks in terms of exciter element 88 (E1) being coupled to device element 62 (T1) and exciter element 90 (E2) being coupled to device element 64 (T2), the invention also works with exciter element 88 (E1) coupled to device element 64 (T2) and with exciter element 90 (E2) coupled to device element 62 (T1).

In FIG. 12B, the device 32 is shown oriented relative to the portion of the antenna array 86 such that power up will not be successful. Both of the device elements 62 (T1) and 64 (T2) are opposite (over) the same exciter element 90 (E2). As a consequence, a voltage differential is unlikely to be set up between the two elements 62 (T1) and 64 (T2), and power up is unlikely. Similarly, power up would be impossible if both device elements 62 and 64 were disposed opposite (over) the other exciter element 88 (E1) or if both device elements were positioned equally opposite (over) each of the exciter elements 88 (E1) and 90 (E2). Thus, a challenge in achieving sufficient electrostatic coupling between the device 32 and the exciter/receiver apparatus 30 is to achieve appropriate orientation and positioning of the device elements 62 (T1) and 64 (T2) and the exciter array elements 88 (E1) and 90 (E2). It is, therefore, important that shape, dimensions and spacing between device antenna elements be appropriately matched to the shape dimensions and spacing of the balanced exciter elements. It is not necessary, however, that device antenna element dimensions be the same as exciter element dimensions. For example, an alternative embodiment (not shown) might employ elongated thin device antenna elements excited by wider exciter elements. It has been found that exciter element sizes and shapes may depend, not only upon the size and shape of remote device antenna elements, but also up on the likely trajectory of a device as it passes over an array of exciter elements. As explained below, the required device antenna orientation relative to an array of exciter elements, for example, can be achieved dynamically by electronically changing the relative positioning of the balanced out of phase exciter elements 88 and 90 within the antenna array 86.

In order to achieve the required orientation of device elements and exciter elements, an exciter antenna array in accordance with the invention may comprise either a fixed array or a commutating array of exciter elements. In a fixed array, the relative phasing of voltage signals applied to different exciter elements is fixed. That is, if two exciter elements have a balanced out of phase relation with each other, then that relationship is fixed. In a commutating array, the phase relationships of voltage signals applied to different exciter elements can change. In a commutating array, for example, a controller (not shown) determines the phase relation of the excitation of different antenna elements. For instance, as explained below, in one configuration two adjacent elements may be in a balanced out of phase relationship. However, at a later time, those two elements may operate in phase with each other. In either the fixed or the commutating case, however, the spacing between exciter elements is matched to the spacing between the device antenna elements of a remote communication device. This spacing ensures maximum electrostatic coupling of power from the exciter to the remote device.

Figure 13:
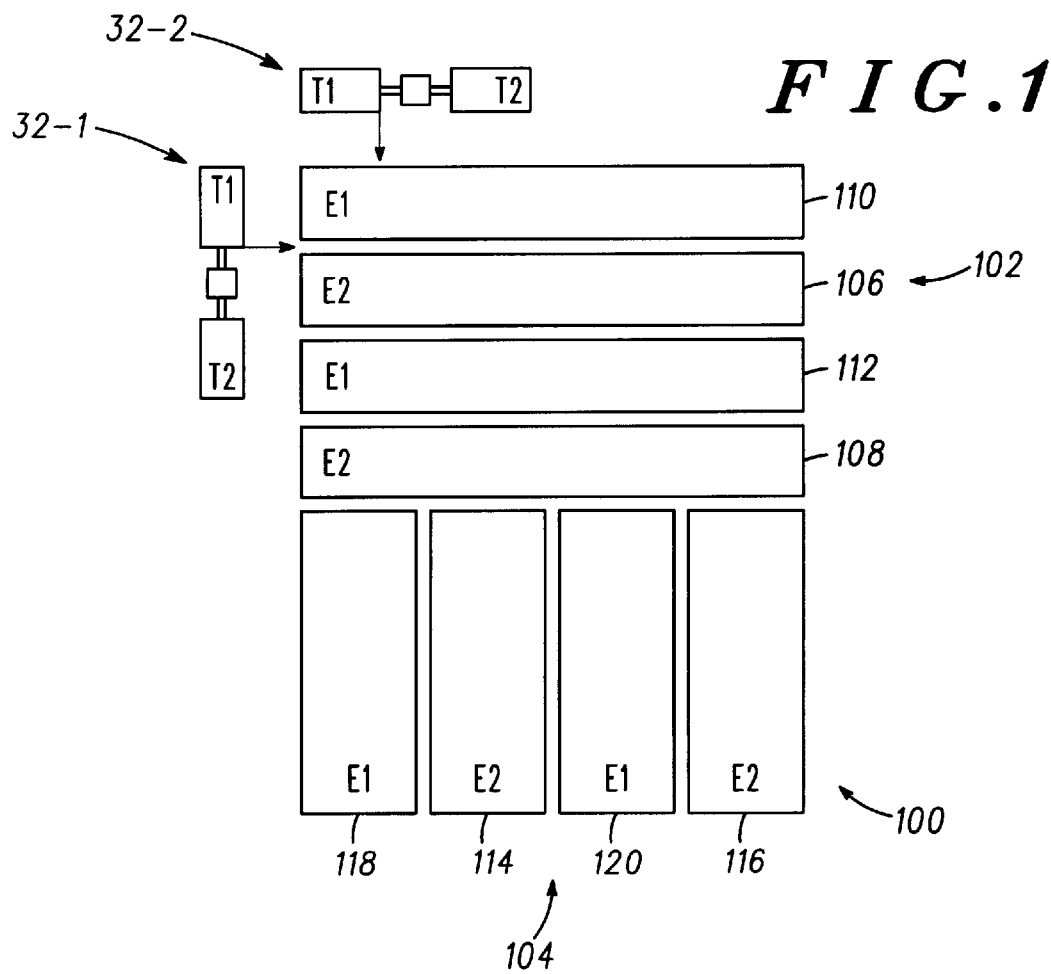
FIG. 13 is a simplified top elevation view of a portion of an array of fixed exciter elements which includes elongated horizontal exciter elements and elongated vertical elements.

The illustrative drawing of FIG. 13 shows a fixed exciter antenna array 100 in accordance with the invention. The array 100 includes a group of elongated horizontal exciter antenna elements 102 and a group of elongated vertical exciter elements 104. Each of the horizontal exciter elements is connected to either the top or the bottom terminal of the secondary coil 38 (FIG. 1). Similarly, each of the vertical exciter elements is connected to either the top or the bottom terminal of the secondary coil 38. The horizontal exciter elements on either side of any given horizontal exciter element have a balanced out of phase voltage relationship to the given horizontal exciter element. Likewise, the vertical exciter elements on either side of any given vertical exciter element have a balanced out of phase voltage relationship to the given vertical exciter element. For example, if horizontal exciter elements 106 and 108 are connected to the top of the secondary coil, then exciter elements 110 and 112 are connected to the bottom of the secondary coil. Further, for example, if vertical exciter elements 114 and 116 connected to the top of the secondary coil, then vertical exciter elements 118 and 120 are connected to the bottom of the secondary coil. In a presently preferred embodiment, the spacing between adjacent horizontal exciter elements and between adjacent vertical exciter elements is approximately the same as the spacing between the remotely powered communication device elements.

In operation, a first communication device 32-1 is oriented so that its antenna elements will be opposite adjacent horizontal exciter elements as it moved across the face of the antenna array 100 in the direction of the horizontal arrow. Hence, the first device will be oriented for maximal power coupling with the horizontal exciter elements as it horizontally crosses the group of horizontal elements 102. A second device 32-2 is oriented so that its device antenna elements will be opposite adjacent vertical exciter elements as it moves across the face of the antenna array 100 in the direction of the vertical arrow. Thus, the second device will be oriented for maximal power coupling with the vertical exciter elements as it vertically crosses the group of vertical elements 104.

The drawings of FIG. 13 represent only a portion of a larger array in which there are numerous groups, 102 and 104, of horizontal and vertical exciter elements oriented as shown. During intervals when a device 32-1 or 32-2 is disposed for maximal power coupling, the device will power up and transmit information. The illustrated grouping of exciter elements seeks to ensure that at some point as device is moved across the exciter antenna array, the device will have sufficient power coupled to it to power up and become operational.

Figure 14A:
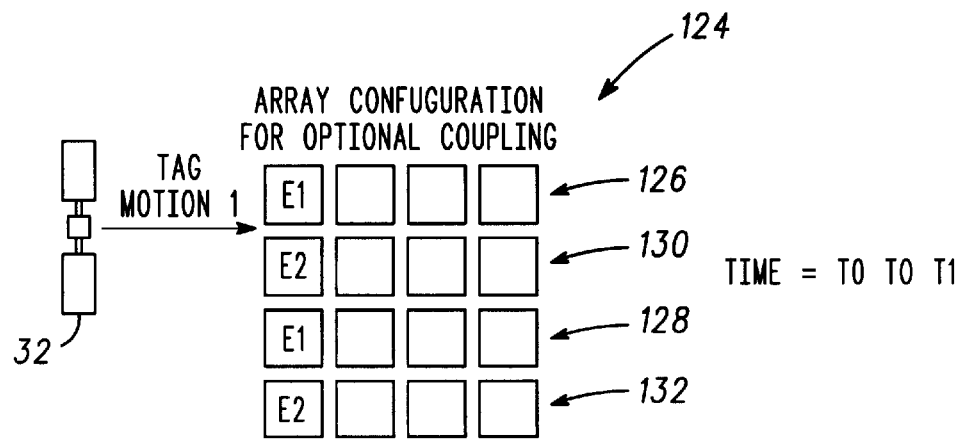

Referring to the illustrative drawings of FIGS. 14A–14C, there are shown three different configurations of a single portion of a commutated antenna array 124 in accordance with a current embodiment of the invention. Over the course of three time intervals, the array 124 is switched from the horizontal configuration in FIG. 14A, to the diagonal configuration in FIG. 14B, and finally, to the vertical configuration in FIG. 14C. The array consists of a plurality of identically shaped (square in the current embodiment) exciter plates that are arranged in symmetrical rows and columns as shown.

In the horizontal configuration shown in FIG. 14A, all of the exciter elements in a given horizontal row share the same voltage phase, and the exciter elements in rows adjacent to the given row all share a balanced out of phase voltage relationship to the given row. That is, the exciter elements in rows 126 and 128 are in balanced out of phase relation with the voltage of the exciter elements in rows 130 and 132. In the horizontal configuration, the array is optimally configured to couple power to a communication device 32 moving across the array in the direction of the horizontal arrow.

In the diagonal configuration shown in FIG. 14B, each exciter element in a given row is in a balanced out of phase voltage relation with adjacent exciter elements on either side of it in the same row and with adjacent exciter elements above and below it in the same column. Conversely, each exciter element in a given column is in a balanced out of phase relation with exciter elements above and below it in the same column and with adjacent exciter elements on either side of it in the same row. That is, for example, exciter element 134 is in a balanced out of phase voltage, relation with exciter elements 136 and 138 on either side of it in the same row and with exciter elements 140 and 142 above and below it in the same column. In the diagonal configuration, the array is optimally configured to couple power to a communication device 32 moving diagonally across the array, such as in the direction of the diagonal arrow.

In the vertical configuration shown in FIG. 14C, all of the exciter elements in a given vertical column share the same voltage phase, and the exciter elements in columns adjacent to the given column all share a balanced and out of phase relationship relative to the voltage of the given column. That is, the exciter elements in columns 144 and 146 are in a balanced out of phase relation with the exciter plates in columns 148 and 150. In the vertical configuration, the array is optimally configured to couple power to a communication device 32 moving across the array in the direction of the vertical arrow.

FIG. 15 illustrates yet another alternative technique for energizing an array of exciter elements. Rather than step through a sequence of horizontal, diagonal and vertical stripes of plates as shown in FIGS. 14A–14C, a pair of appropriately spaced balanced out of phase stripes 202 and 204 (of individual elements), is swept in a circular pattern across the exciter element array as indicated by the arrows. At some point during the sweep, the antenna elements of a remote device (not shown) disposed sufficiently close to the exciter are likely to be suitably aligned for power up. More specifically, in FIG. 15, there is shown a portion of an array 200 of exciter elements. The individual exciter elements of the array 200 are energized such that a plurality of individual exciter elements that comprise the two stripes (shaded) 202 and 204 are in phase with each other but out of phase with other individual (unshaded) exciter elements. The orientation of the two stripes changes with time, but they remain parallel to each other. Thus, for example, in FIG. 15 the stripes 202 and 204 are shown vertically oriented. At other times they will be horizontally oriented, and at still other times they will be diagonally oriented. While a pair of balanced out of phase stripes rotating in a circular motion is shown, it will be appreciated that other dynamically changing exciter element patterns and movements can be practiced consistent with the invention.

Figure 16:
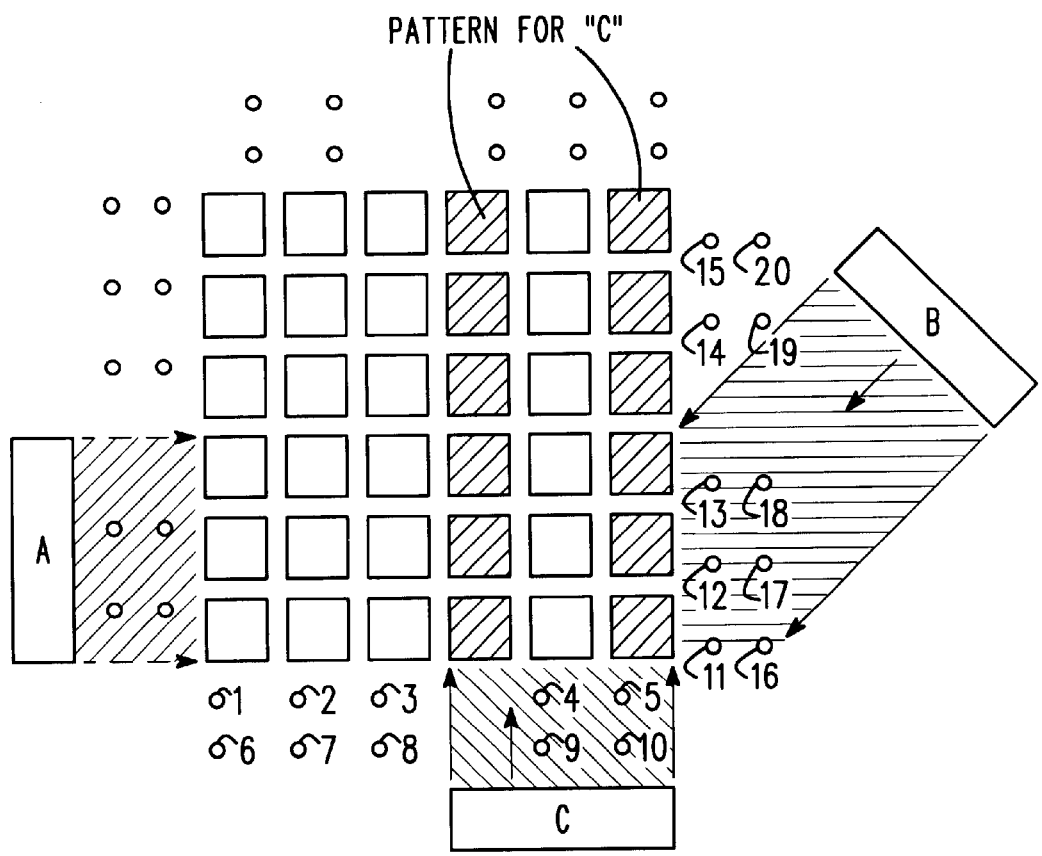
FIG. 16 is a top elevation view of still another alternative commutated exciter array configuration in which the array is bounded by sensors which detect the motion of a communication device across the array.

The illustrative drawing of FIG. 16 depicts yet another approach to energizing an array of exciter elements in accordance with the invention. In the embodiment of FIG. 16, the exciter antenna elements are arranged in an array of rows and columns. An array of sensors designated 1–20, such as optical sensors, are disposed about the periphery of the array of exciter antenna elements. The sensors detect the presence and direction of motion of a communication device, such as device "A" (horizontal), "B" (diagonal) or "C" (vertical). In response to sensor detection of motion, an array controller (not shown) selects an excitation configuration for the array which is likely to couple energy most efficiently to the device as the device passes across the face of the array. For example, depending upon the detected motion of the device, the optimal array configuration may be a horizontal configuration as illustrated in FIG. 14A, a diagonal configuration as illustrated in FIG. 14B, or a vertical configuration as illustrated in FIG. 14C.

While particular embodiments of the invention have been described in detail herein, it will be appreciated that various modifications can be made to the preferred embodiment without departing from the scope of the invention. Thus, the foregoing description is not intended to limit the invention which is defined in the appended claims.

We claim:

1. A method for constructing a portable identification device which, when operable, capacitively couples to a second device, the method comprising the steps of:
   providing an electrically insulating carrier;
   placing on the electrically insulating carrier an antenna element;
   securing a circuit, which comprises first and second terminals, to the electrically insulating carrier; and
   electrically coupling the first terminal to the antenna element; and
   electrically coupling the second terminal to an external ground potential.

2. The method of claim 1 wherein the steps of securing and electrically coupling the first terminal involve using a conductive adhesive to secure the circuit to the electrically insulating carrier and to electrically couple the first terminal to the antenna element.

3. The method of claim 1 wherein the step of placing involves depositing a layer of conductive material onto the electrically insulating carrier.

4. The method of claim 1 wherein the second terminal is electrically coupled to the external ground potential via a second antenna element.

5. A capacitively coupled data communication system comprising:
   a portable communication device comprising:
      a circuit coupled to an external ground potential; and
      an antenna element electrically coupled to the circuit;
   an exciter device comprising:
      an exciter circuit which produces an excitation signal that powers up the portable communication device;
      an exciter antenna element coupled to the exciter circuit and capacitively coupled to the antenna element of the portable communication device;
      a receiver antenna element capacitively coupled to the antenna element of the portable communication device, and which receives data signals transmitted by the portable communication device; and
      a receiver circuit which is coupled to receive data signals received from the receiver antenna element.

6. A capacitively coupled data communication system comprising:
   a portable communication device comprising:
      a circuit; and
      a first antenna element and a second antenna element each of which is electrically coupled to the circuit and each of which is isolated from the other;
   an exciter device comprising:
      an exciter circuit which produces at least one excitation signal that powers up the portable communication device;
      an antenna array which includes exciter antenna elements;
      a receiver antenna element which receives data signals transmitted by the portable communication device;
      a receiver circuit which is coupled to receive data signals received from the receiver antenna element;
      a control circuit which selectively connects at least one exciter antenna element of the antenna array to the exciter circuit; and
      a plurality of sensors disposed adjacent to the array of exciter antenna elements, the plurality of sensors arranged to detect the presence and direction of motion of the portable communication device, wherein the control circuit is further arranged to selectively connect one or more exciter antenna elements of the array based upon the portable communication device motion sensed by at least one of the plurality of sensors.

7. A capacitively coupled data communication system comprising:
   a portable communication device comprising:
      a circuit; and
      a first antenna element and a second antenna element each of which is electrically coupled to the circuit and each of which is isolated from the other;
   an exciter device comprising:
      an exciter circuit which produces at least one excitation signal that powers up the portable communication device;
      an antenna array which includes exciter antenna elements;
      a receiver antenna element which receives data signals transmitted by the portable communication device;
      a receiver circuit which is coupled to receive data signals received from the receiver antenna element; and
      a control circuit which selectively connects at least one exciter antenna element of the antenna array to the exciter circuit,
   wherein multiple sensor elements are disposed about a periphery of the array of exciter antenna elements, the multiple sensor elements arranged to detect the presence and direction of motion of the portable communication device.

8. A portable communication device which, when operable, capacitively couples to a second device, the portable communication device comprising:
a circuit operably coupled to an external ground potential; and
an antenna element electrically coupled to the circuit.

9. The portable communication device of claim 8 further comprising: a substrate, wherein the antenna element is formed on the substrate, and wherein the circuit is secured to the substrate.

10. The portable communication device of claim 9 wherein the substrate is selected from a group consisting of: paper, acetate, molar, polyester, polyethylene, polypropylene, polypropylene with calcium carbonate, plastic, electrically insulating tape.

11. The portable communication device of claim 9 wherein the substrate is paper and the antenna element is formed of conductive ink.

12. The portable communication device of claim 9 wherein the substrate is acetate and the antenna element is formed of conductive ink.

13. The portable communication device of claim 9 wherein the substrate is paper and the antenna element is a conductive material.

14. The portable communication device of claim 9 wherein the substrate is plastic and the antenna element is a conductive material.

15. The portable communication device of claim 9 further comprising a conductive adhesive that secures the circuit to the substrate and that electrically couples the circuit to the antenna element.

16. The portable communication device of claim 8 wherein the circuit further comprises:
circuitry for receiving energy from the antenna element;
a memory comprising stored information; and
a circuit powered by the circuitry that generates a frequency that is modulated as a function of the stored information.

17. The portable communication device of claim 8 wherein the circuit further comprises:
a memory having stored digital information; and
a signal generator arranged for generating a carrier signal that is modulated based on the stored digital information.

18. The portable communication device of claim 17 wherein the signal generator is electrically coupled to the antenna element.

19. The portable communication device of claim 17 further comprising a second antenna element electrically coupled to the signal generator so as to transmit digital signals produced by the signal generator.

20. The portable communication device of claim 8 wherein the circuit is operably coupled to the external ground potential via a second antenna element.

21. The portable communication device of claim 8 wherein the circuit derives operating power from an electrostatic field in the vicinity of the antenna element.

22. A portable communication device which becomes operable when electrostatically coupled to a second device, the portable communication device comprising:
a circuit coupled to an external ground potential; and
at least a first antenna element electrically coupled to the circuit.

23. A capacitively coupled data communication system comprising:
a portable communication device comprising:
a circuit; and
a first antenna element and a second antenna element each of which is electrically coupled to the circuit and each of which is isolated from the other;
an exciter device comprising:
an exciter circuit which produces at least one excitation signal that powers up the portable communication device;
an antenna array which comprises exciter antenna elements, wherein the exciter antenna elements are excited in a dynamically changing pattern; and
a control circuit which selectively connects at least one exciter antenna element of the antenna array to the exciter circuit.

24. A method comprising the steps of:
at a first device:
providing a first antenna element;
generating an electric voltage signal on the first antenna element; and
transmitting an electric field signal via the first antenna element and an external ground potential; and
at a second device:
providing a device antenna element and a circuit, wherein the circuit is coupled to the external ground potential; and
receiving energy from the electric field via the device antenna element.

25. The method of claim 24 wherein the step of transmitting further comprises the step of generating a carrier signal having a frequency with a range of 25 Hz to 40 MHz.

26. The method of claim 24 wherein the external ground potential is an earth ground.

27. The method of claim 38 further comprising the step of orienting the second device such that the device antenna element receives the electric field signal.

28. The method of claim 24 further comprising the step of transmitting data via the device antenna element.

29. The method of claim 27 wherein the step of orienting involves positioning the second device a distance away from the first device in a range from 0.2 mm to 50 M.

30. A device comprising:
an exciter circuit coupled to an external ground potential, wherein the exciter circuit produces an electrostatic excitation signal that capacitively powers a second device;
an exciter antenna element coupled to the exciter circuit;
a receiver circuit coupled to the external ground potential, wherein the receiver circuit capacitively couples to the second device to receive data signals transmitted from the second device; and
a receiver antenna element coupled to the receiver circuit.

31. The device of claim 30 wherein the second device is coupled to the external ground potential.

32. The device of claim 30 further comprising a detector, coupled to the receiver circuit, for detecting data from the data signals transmitted from the second device.

33. The device of claim 32 further comprising a processor, coupled to the detector, for formatting the data.

34. A portable communication device comprising:
a first antenna element and a second antenna element; and
a circuit coupled to the first antenna element, the second antenna element and an external ground potential, and which derives a supply voltage from a voltage difference between the first antenna element and the external ground potential, and which transmits signals over the second antenna element.

35. The device of claim 34 wherein the circuit is operably coupled to the external ground potential via a third antenna element.

36. The device of claim 34 further comprising a substrate on which the first and second antenna elements are disposed and which provides electrical isolation between the first and second antenna elements and the external ground potential.

37. A remotely powered device comprising:
an antenna element having a dimension; and
a circuit coupled to the antenna element and an external ground potential, for receiving energy from an excitation signal having a wavelength via the antenna element,
wherein the dimension of the antenna element is independent of the wavelength of the excitation signal.

38. The device of claim 32 wherein the circuit is operably coupled to the external ground potential via a second antenna element.

39. The device of claim 38 wherein the second antenna element has a second dimension, and the second dimension of the second antenna element is independent of the wavelength of the excitation signal.

40. A capacitively coupled system comprising:
an exciter device comprising:
an exciter circuit coupled to an external ground potential;
an exciter antenna element coupled to the exciter circuit;
a receiver circuit coupled to the external ground potential;
a receiver antenna element coupled to the receiver circuit; and
a remotely powered device comprising:
a device antenna element capacitively coupled to the exciter antenna element and the receiver antenna element; and
a circuit couples to the device antenna element and to the external ground potential.

41. The system of claim 40 wherein the circuit couples to the external ground potential via a second device antenna.

42. The system of claim 41 wherein he antenna element has a different conductivity than the second antenna element.

43. The system of claim 41 wherein the antenna element is constructed of a material different than the second antenna element.

44. The system of claim 40 wherein the device antenna element transmits and receives data signals.

45. The system of claim 40 wherein the external ground potential is an earth ground.

46. The system of claim 40 wherein the device antenna element receives at least one of data and power.

47. A device comprising:
an antenna element; and
a circuit coupled to the antenna element and operably coupled to an external ground potential,
wherein the circuit accepts energy received by the antenna element, and
wherein the antenna element is not required to be resonant with respect to a frequency.

48. The device of claim 47 further comprising a substrate, wherein the antenna element and the circuit are disposed on the substrate.

49. The device of claim 48 wherein the substrate is a non-conductive material.

50. The device of claim 48 wherein at least a portion of the substrate is covered by a layer of adhesive.

51. The device of claim 50 wherein the adhesive is selected from a group consisting of an anisotropic conductive adhesive, and an isotropic conductive adhesive.

52. The device of claim 48 further comprising an adhesive that secures the circuit to the substrate.

53. The device of claim 44 wherein the circuit further comprises a rectifier coupled to the antenna element.

54. The device of claim 53 wherein the circuit further comprises an energy storage device coupled to the rectifier.

55. The device of claim 47 wherein the antenna element is electrically isolated from the external ground potential.

56. The device of claim 47 wherein the circuit optimizes an impedance between the antenna element and the external ground potential so as to increase a range of operation for the device.

57. The device of claim 47 wherein the circuit optimizes an impedance between the antenna element and the external ground potential so as to decrease a range of operation for the device.

58. The device of claim 47 wherein the circuit further comprises a modulator coupled to the antenna element.

59. The device of claim 47 wherein the circuit further comprises a memory for storing information.

60. The device of claim 47 wherein the circuit further comprises a counter coupled to the antenna element, for generating timing signals.

61. The device of claim 47 wherein the antenna element is substantially non-metallic.

62. The device of claim 47 wherein the antenna element is quasi-conductive.

63. The device of claim 47 wherein the circuit is operably coupled to the external ground potential via a second antenna element.

64. The device of claim 49 therein the antenna element is conductive.

* * * * *

UNITED STATES PATENT AND TRADEMARK OFFICE
CERTIFICATE OF CORRECTION

PATENT NO. : 6,611,199 B1
DATED : August 26, 2003
INVENTOR(S) : Geiszler et al.

It is certified that error appears in the above-identified patent and that said Letters Patent is hereby corrected as shown below:

Column 17,
Line 14, delete "molar" and insert -- mylar --
Lines 17, 20, 23, 26 and 30, after "claim" delete "9" and insert -- 8 --

Column 19,
Line 21, after "claim" delete "32" and insert -- 37 --

Column 20,
Line 23, after "claim" delete "44" and insert -- 47 --
Line 51, after "claim 49" delete "therein" and insert -- wherein --

Signed and Sealed this

Twenty-second Day of June, 2004

JON W. DUDAS
*Acting Director of the United States Patent and Trademark Office*